May 7, 1946.   C. G. HOLSCHUH ET AL   2,399,676
SIGHTING DEVICE
Original Filed Sept. 17, 1941
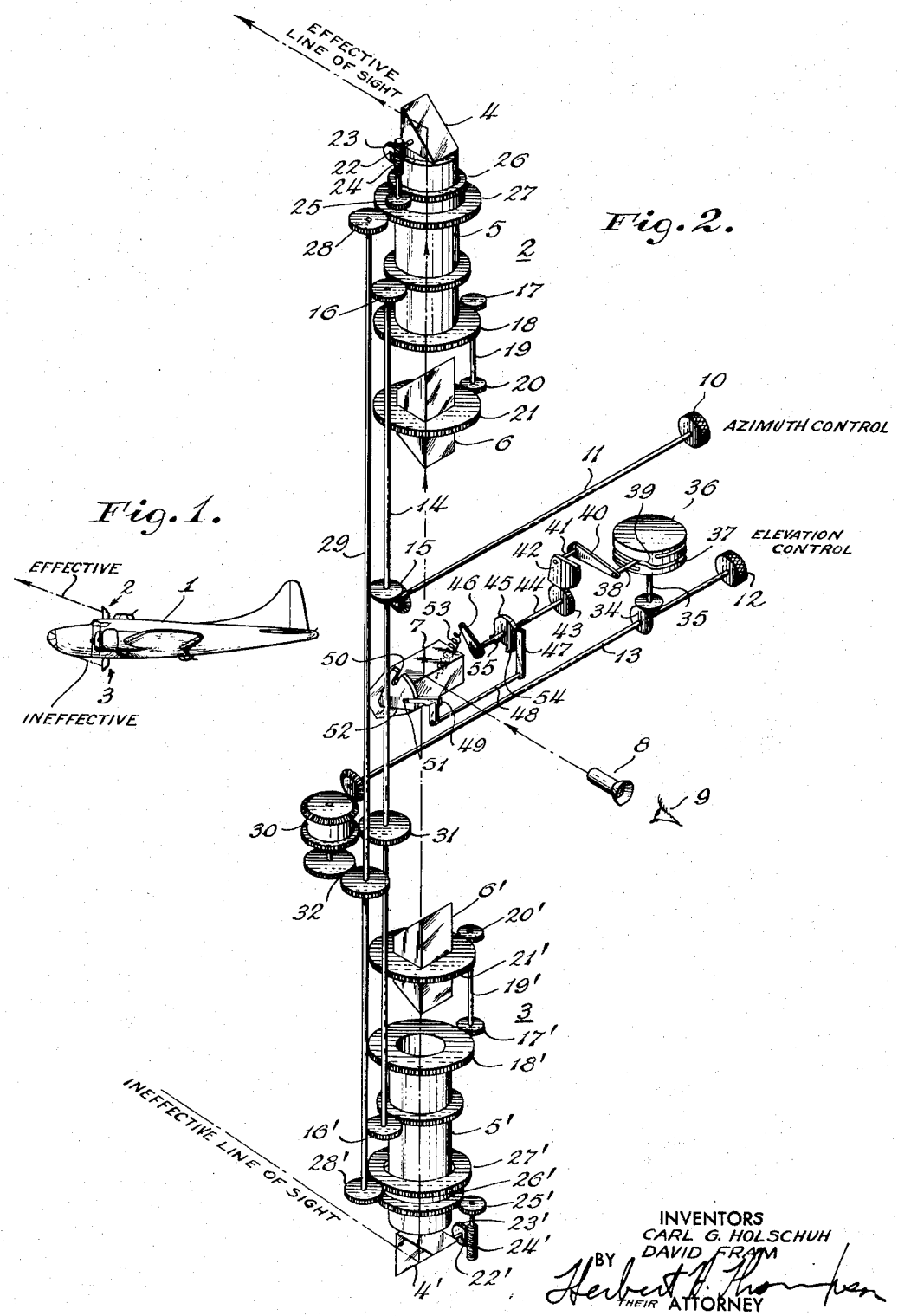
INVENTORS
CARL G. HOLSCHUH
DAVID FRAM
BY Herbert J. Thompson
THEIR ATTORNEY Patented May 7, 1946

2,399,676

UNITED STATES PATENT OFFICE 2,399,676

SIGHTING DEVICE

Carl G. Holschuh, Huntington, and David Fram, Brooklyn, N. Y., assignors to Sperry Gyroscope Company, Inc., Brooklyn, N. Y., a corporation of New York Original application September 17, 1941, Serial No. 411,186. Divided and this application June 30, 1943, Serial No. 492,838

15 Claims. (Cl. 88—1)

This invention relates, generally, to the art including sighting devices and, more particularly, to a novel sighting device especially adapted for use in inter-aircraft fire control systems for continuously obtaining target orientation data for all possible target orientations. This application constitutes a division of copending application Serial No. 411,186, entitled "Inter-aircraft gun sight and computer," filed September 17, 1941, in the names of Carl G. Holschuh and David Fram.

The principal feature of the present invention resides in the provision of means for sighting or orienting a directional line throughout a desired field of operation, preferably over the entire sphere, including all possible angles of elevation and/or azimuth. For this purpose a double-ended sight having spaced viewers or scanning heads is used, one end being adapted, for example, for sighting over one field of view, the other end for sighting over a different field of view. Both heads are trained and elevated simultaneously, but only one is effective at a time. Means are provided for automatically shifting from the upper end to the lower end and vice versa, as the sighting angle passes through a predetermined position, such as zero elevation. Beyond such a position the path of the energy flowing between the target and one of the scanning heads is obstructed by some intervening portion of the structure upon which the sighting device is mounted. Accordingly, irrespective of the nature of the energy employed, the energy flow is continuous and passes between the target and a central data indicating or recording point at the device via one or the other of the scanning heads.

Accordingly, the principal object of the present invention is to provide a full sphere sighting apparatus.

Another object of the invention is to provide a sighting device with which a target may be continuously tracked as it travels from one side of the craft upon which the sight is mounted to the opposite side.

Other objects and advantages will become apparent from the specification, taken in connection with the accompanying drawing wherein one embodiment of the invention is illustrated.

In the drawing,

Fig. 1 is a perspective view showing an aircraft mounting the double-ended sight or dual telescope of the present invention, and Fig. 2 is a detailed schematic representation of the details of a preferred embodiment of the invention.

Similar characters of reference are used in the above figures to indicate corresponding parts.

As shown in Fig. 1, the sighting device of the present invention may be advantageously used on an aircraft 1. The sighting device may be mounted on the craft such as to have one end, the upper end 2, directed into one field of view, for example, the upper hemisphere. The upper end then is capable of sighting any target lying either in the upper hemisphere or slightly in the lower hemisphere. The lower end 3 may be displaced 180° in elevation from the upper end 2, as shown. Thus, the lower end 3 may define a line of sight to any target lying either in the lower hemisphere or slightly in the upper hemisphere. By the use of two oppositely arrayed optical systems therefore a periscopic sighting instrument capable of viewing in all directions is provided.

In Fig. 2 the details of an optical version of a sighting device incorporating the features of the present invention are clearly shown. The elements of the upper end 2, which serves to sweep the upper hemisphere, are duplicated by corresponding elements of the lower end 3, which serves to sweep the lower hemisphere both ends sweeping their respective hemispheres in unison. Since the construction and operation of both the upper and lower ends are identical, the upper end alone will be described. The elements of the lower end 3 are given the same reference numerals as the corresponding elements of the upper end 2, but are primed.

As shown in Fig. 2, the upper end 2 is optically effective for sighting a target lying in the upper hemisphere. The optical path for light rays in this case is as follows. Light rays from a sighted object, such as a target, are picked up in a scanning head or viewer such as an entrance reflecting prism 4 and reflected down the main body 5 of the sight. The rays are then reflected by a dove prism 6 to provide an erect and non-reversed image, and proceed to penta-prism 7 located in the central zone of the instrument where they are doubly reflected into the eye-piece 8 and are there viewed by the eye 9 of the observer. When the sighting device is adjusted so as to be optically effective over the lower hemisphere, the corresponding portions of the lower end 3 would constitute the corresponding path for transmission of the light rays to penta-prism 7, whence the light rays would be reflected as before to the eye-piece 8.

In order to track a moving target such as another aircraft with the sighting device, two controls are provided, constituting an azimuth control knob 10 actuating shaft 11, and an elevation control knob 12 actuating shaft 13. By proper adjustment of control knobs 10 and 12, an operator may vary the line of sight both in azimuth and in elevation to maintain it on the target and to thereby maintain the image of the target viewed by the operator centered with respect to a reticle provided in eye-piece 8. Although "pure displacement" tracking control in elevation and azimuth is shown in Fig. 2, any desired type of control such as "rate" tracking control or "aided" tracking control may be provided. In any case, as will be seen, when the target is being properly tracked, the angular displacement of shaft 11 will be proportional to the target azimuth angle, and the angular displacement of shaft 13 will be proportional to the target elevation angle, and these displacements may be introduced into suitable computing mechanism as necessary data in the computation of the gun angles required to hit the target.

In order to control the orientation of the line of sight in azimuth from knob 10 and shaft 11, the latter shaft is connected to shaft 14 as by gearing 15. Shaft 14 rotates the main body 5 of the sight through a pinion 16 and thus controls the orientation of the defined line of sight in azimuth. In order to maintain the proper optical relations as the sight is moved in azimuth, dove prism 6 must be rotated together with main body 5 and at one half the angular displacement of body 5. Hence, pinion 17, engaging ring gear 18 fastened to main body 5, is connected as by a shaft 19 to a second pinion 20 which drives dove prism 6 as by means of a gear 21 fastened thereto. The gear ratios are suitably chosen to provide the proper angular relations.

The elevation control of the line of sight from control knob 12 is quite similar to the azimuth control just described. Variation of the elevation of the line of sight is obtained by rotating the reflecting prism 4 about a horizontal axis 22. For this purpose a worm wheel 23 is fastened to the pivot axis 22 of prism 4 and is driven by a worm 24, which in turn is driven by a pinion 25 engaging an annular ring gear 26 rotatably mounted on main body 5 of the sight. Fixed to ring gear 26 is a second ring gear 27 engaged by a pinion 28 which is driven from shaft 29 which in turn is actuated from the output of a differential 30. One input member of differential 30 is driven by elevation control shaft 13, while the second input member is driven from the azimuth control shaft 11 through gearing 15, shaft 14, and gearing 31. The output member of differential 30 then drives shaft 29 through gearing 32 to rotate the line of sight in elevation.

Differential 30 is necessitated by the fact that worm gear 24 and pinion 25 are carried by the main body 5 of the sight while gear 26 engaging pinion 25 is not so carried. Hence, turning main body 5 in azimuth causes pinion 25 to "walk around" gear 26, resulting in rotation of pinion 25, worm 24, worm wheel 23, and prism 4, and thus a change in elevation of the line of sight. To compensate for this effect, gear 26 is simultaneously turned backward by an equal amount, this being done by the connection of azimuth control shaft 11 to gear 26 through differential 30 and gearing 32, 28, and 27 so that the elevation of the line of sight is not affected by changes in azimuth thereof.

In order to provide means for transferring energy or optical effectiveness from one to the other of ends 2 and 3 of the sighting device, penta-prism 7 is automatically snapped over when the elevation of the line of sight passes through zero elevation. For this purpose a shaft 35 is coupled directly to elevation control shaft 13 as by gearing 34 and is therefore controlled exactly in accordance with the elevation of the line of sight. Shaft 35 carries a cylindrical cam 36 having a control groove 37 in which rides a follower pin 38. Groove 37 is formed to have a sharp change in an axial direction at 39, whose position corresponds to zero elevation. The remaining portions of groove 37 are formed to have little or no axial change.

Fastened to pin 38 is a crank 40 having cross shaft 41, to which is fastened a gear segment 42. Engaging with gear segment 42 is a pinion 43 fastened to another cross shaft 44 which also carries a cam 45 and an arm 46. Cooperating with cam 45 is a follower 47 connected to a shaft 48 which carries a latch 49 mating with one of notches 50 and 51 in a member 52 fastened to penta-prism 7. A spring 53 is fastened at one end to arm 46 and at the other end to a point of prism 7 on the far side of its axis of rotation. This mechanism is designed and adjusted to operate as a toggle mechanism which provides penta-prism 7 with two positions of stability on opposite sides of a position of instability, the two positions of stability corresponding to the positions of optical effectiveness of the two ends of the sighting device.

The operation is as follows: In the position shown, the upper end 2 of the sighting device is in use, but the angle of elevation is small, as indicated by the position of pin 38 close to point 39 of groove 37, which point corresponds to zero elevation, as has been explained. As the elevation angle increases, shaft 35 will turn cam 36 in a clockwise direction. Cam pin 38 riding in groove 37 will pass portion 39 of the groove and will be driven downward, rotating crank 40 and gear segment 42 in a clockwise direction. Gear 43 and cam 45 will thus be caused to rotate in a counterclockwise direction. High spot 54 on cam 45 will push out cam follower 47, causing latch 49 to move out of notch 51. However, at this point arm 46 has not yet passed the point corresponding to the toggle instability point, and spring 53 still keeps penta-prism 7 in its indicated position, as by holding it against a suitable stop (not shown). Upon further rotation of cam 45 and arm 46, high spot 55 lifts follower 47 to again lift latch 49. Spring 53 by this time has passed the toggle position and snaps prism 7 over against another stop (not shown). Upon further rotation of cam 45, latch 49 falls into notch 50 and keeps prism 7 locked into place.

Upon reversal of the direction of change of elevation angle, the reverse happens. For either direction of change of elevation, penta-prism 7 is not snapped over until the angle of elevation has passed through the zero value by a suitable amount. This amount can be made by suitable design to be very small, such as of the order of 3 degrees.

In this manner a target which, for instance, is flying in the upper hemisphere with respect to the aircraft may be sighted by an operator through the upper end 2 of the sighting device with penta-prism 7 in the position indicated. Should the target then enter the lower hemisphere, penta-prism 7 will automatically snap over, rendering the lower end 3 of the optical device effective in sighting the target. Since the line of sight defined by the lower end 3 always has the same orientation as the line of sight defined by the upper end 2, no interruption in the tracking of the target would occur. Also, since the transfer of optical effectiveness is accomplished automatically and practically instantaneously, the operator would have no conscious knowledge of the transfer. As a result one operator can continuously track a target regardless of the position the target takes with respect to the aircraft and can thereby continuously introduce target orientation data (the angular displacements of shafts 11 and 13) into a suitable computer.

It will be clearly understood that while the principles of the invention are applicable generally, the present disclosure specifically describes an optical device employing light rays merely as one simple illustration of the novel features of the present invention. It is therefore not intended that the invention in any way be limited to optical sighting devices. Any system having scanning heads whose directivity axes are arranged to sweep respective hemispheres in unison including a selective transferring device whose throw-over from one scanning head to the other is definitely correlated with the position of the target relative to the position of the craft mounting the device, may be used instead of the optical system disclosed for illustrative purposes only without departing from the scope of this invention; and this is so irrespective of the nature of the energy employed for the operation of the device disclosed by applicants. Also, it will be apparent that the two ends of the sighting or energy receptive device employed could be rendered optically effective over other portions of the sphere than an upper and lower hemisphere by mounting the sighting device differently on the aircraft. For instance, the sighting device could be mounted laterally on the aircraft so that one end would cover the hemisphere on the right side of the craft, and the other end would cover the hemisphere on the left side of the craft. In such a case, the automatic transfer of optical effectiveness would take place when the target passed from the right hemisphere to the left hemisphere, or vice versa. Since this would then correspond to passage of the target through the normally vertical plane defined by the azimuth orientations of zero and 180 degrees, the automatic transfer apparatus would be actuated from the azimuth control shaft instead of the elevation control shaft, as is done in the present embodiment of the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device for tracking targets comprising a pair of sighting elements disposed on opposite sides of a vehicle, individual means supporting the respective elements for rotation about two intersecting axes, common control means for displacing the elements in unison about their axes for tracking a target on one side or the other of the vehicle, and means operated by the control means in predetermined positions thereof for causing the respective sighting elements to be effective alternately for tracking a target which first appears on one side of the vehicle and then crosses over to the other.

2. A device for tracking targets comprising a pair of sighting elements having substantially different fields of view disposed on opposite sides of a vehicle, individual means supporting the elements for rotation about two intersecting axes, common control means including a shaft for displacing the elements in unison for tracking targets by the device within both fields of view, and means operated by the shaft in predetermined positions thereof for causing the respective sighting elements to be effective alternately for the continuous tracking of targets which are observable first from one side of the vehicle and then the other.

3. A device for tracking targets comprising a pair of sighting elements having substantially different fields of view disposed on opposite sides of a vehicle, individual means supporting the elements for rotation about two intersecting axes, common control means including a pair of shafts for displacing both elements in unison about their axes for tracking targets within both fields of view, and means operated by but one of the shafts in predetermined positions thereof for causing the respective sighting elements to be effective alternately for the continuous tracking of targets which are observable first from one side of the vehicle and then the other.

4. A device for tracking targets comprising a pair of sighting elements having substantially different fields of view disposed on opposite sides of a vehicle, individual means supporting the elements for rotation about two intersecting axes, common control means including a pair of shafts for displacing both elements in unison about their respective axes for tracking targets within their respective fields of view, and means comprising a cam driven from one of the shafts and effective in predetermined positions thereof for causing the respective sighting elements to be effective alternately for the continuous tracking of targets which are observable first from one side of the vehicle and then the other.

5. A device for tracking targets comprising a pair of sighting elements disposed on opposite sides of a vehicle, individual means supporting the respective elements for rotation about two intersecting axes, common control means for displacing the elements in unison about their axes for tracking a target on one side or the other of the vehicle, movable reflecting means for causing but one sighting element at a time to be effective depending on the side of the vehicle on which the target is being tracked, and means operated by the control means during tracking as the target is about to pass from one side of the vehicle to the other for actuating the reflecting means.

6. A sighting instrument comprising an eyepiece, a pair of sighting elements disposed to track targets respectively on opposite sides of a vehicle, movable control means for moving the elements in unison about two intersecting axes for target tracking purposes, a common eyepiece for said members, a light deflecting member adapted to be positioned by the control means in either of two positions for completing an optical path from the eyepiece only to the sighting member through which the target is to be observed, and a mechanism actuated by the control means in a predetermined position thereof for changing the position of the light deflecting member so as to shift the optical path from the eyepiece to the opposite sighting member when the position of the target changes to the opposite side of the vehicle.

7. A sighting instrument comprising an eyepiece, a pair of oppositely extending sighting elements respectively effective to track targets on opposite sides of a vehicle, movable control means for rotating the elements in unison about two intersecting axes for target tracking purposes, a light deflecting device adapted to be selectively positioned by the control means to complete the optical path between the eyepiece and the sighting element through which the target is to be observed, and a mechanism actuated in a predetermined position of the control means and in accordance with the direction of movement thereof for shifting the position of the light deflecting device to complete the optical path from the eyepiece to the opposite sighting member.

8. A sighting instrument comprising an eyepiece, a plurality of sighting members having separate fields of view, tracking means comprising a mechanism coupled with said sighting members for causing said sighting members to follow movements of objects in their respective fields of view, a light deflecting member adapted to be selectively positioned to complete the optical path between any one of the sighting members and said eyepiece, a mechanism for shifting said light deflecting member to any one of a plurality of predetermined positions, and a device actuated by said tracking means in predetermined positions of said sighting members for operating said mechanism to effect a shift in the position of said light deflecting member.

9. A sighting instrument comprising an eyepiece, a plurality of sighting members having separate fields of view, tracking means comprising a mechanism coupled with said sighting members for causing said sighting members to follow movements of objects in their respective fields of view, a light deflecting member adapted to be selectively positioned to complete the optical path between any one of the sighting members and said eyepiece, a mechanism for shifting said light deflecting member to any one of a plurality of predetermined positions, and a cam device actuated by said tracking means effective in predetermined positions of said sighting members for operating said shifting mechanism to effect a shift in the position of said light deflecting member.

10. A sighting instrument comprising an eyepiece, a plurality of sighting members having separate fields of view, tracking means comprising a mechanism coupled with said sighting members for causing said sights to follow movements of objects in their respective fields of view, a light deflecting member adapted to be selectively positioned to complete the optical path between any one of said sighting members and said eyepiece, a toggle mechanism for shifting said light deflecting member to any one of a plurality of predetermined positions, displacing means for the last-mentioned mechanism, and a cam actuated by the tracking means during tracking for controlling the direction of the displacing of the toggle mechanism.

11. A sighting instrument comprising an eyepiece, a plurality of sighting members having separate fields of view, tracking means comprising a mechanism coupled with said sighting members for causing said sighting members to follow movements of objects in their respective fields of view, a light deflecting member adapted to be shifted to complete according to its position the optical path between said eyepiece and a predetermined one of said sighting members, a mechanism for shifting said light deflecting member to a predetermined position, and cam means driven by the tracking means for actuating the shifting mechanism.

12. A sighting instrument comprising an eyepiece, a pair of oppositely disposed sighting members having separate fields of view, tracking means coupled with said sighting members for causing said sighting members to follow movements of objects in their respective fields of view, a light deflecting member adapted to be shifted to either of two predetermined positions for selectively completing when in either position the optical path between a predetermined one of said sighting members and said eyepiece, a toggle mechanism for shifting said light deflecting member from one to the other of said positions, and means comprising a cam actuated by said tracking means for operating said toggle mechanism in response to predetermined movements of said sighting members.

13. A sighting instrument comprising an eyepiece, a pair of oppositely arranged sighting members having separate fields of view, tracking means coupled with said sighting members for causing them to follow movements of objects in their respective fields of view, a light deflecting member adapted to be shifted to either of two predetermined positions for selectively completing when so positioned the optical path between a predetermined one of said sighting members and said eyepiece, a mechanism for shifting said light deflecting member from one position to the other, and driving means for said mechanism actuated by said tracking means in accordance with the movements of said sighting members.

14. A sighting instrument comprising an eyepiece, a pair of oppositely arranged sighting members having separate fields of view, tracking means coupled with said sighting members for causing them to follow movements of objects in their respective fields of view, a light deflecting member adapted to be shifted to either of two predetermined positions for selectively completing when positioned the optical path between a predetermined one of said sighting members and said eyepiece, a mechanism for shifting said light deflecting member to either of said two positions, and driving means for said mechanism comprising a cam coupled to said tracking means.

15. A sighting instrument comprising an eyepiece, a pair of oppositely arranged sighting members having separate fields of view, tracking means coupled with said sighting members for causing said sighting members to follow movements of objects in their respective fields of view, a light deflecting member adapted to be shifted to either of two predetermined positions for selectively completing when so positioned the optical path between a predetermined one of said sighting members and said eyepiece, a spring actuated toggle mechanism for shifting said member from one position to the other, and cam means responsive to the movement of said tracking means during a tracking operation for changing the direction of the tension of the toggle spring in response to predetermined movements of said sighting members and thereby operating the toggle mechanism.

CARL G. HOLSCHUH.
DAVID FRAM.